US008805351B2

(12) United States Patent
Sigal et al.

(10) Patent No.: US 8,805,351 B2
(45) Date of Patent: Aug. 12, 2014

(54) SYSTEM AND METHOD FOR FORMING AUTOMATICALLY LAUNCHING USER SET DEFAULT APP FROM SMARTPHONE

(71) Applicant: Myine Electronics, Inc., Ferndale, MI (US)

(72) Inventors: Jacob R. Sigal, Ferndale, MI (US); Philip J. Danne, Royal Oak, MI (US); Joey R. Grover, Elwell, MI (US); Erika Nice, Novi, MI (US)

(73) Assignee: Myine Electronics, Inc., Ferndale, MI (US)

( * ) Notice: Subject to any disclaimer, the term of this patent is extended or adjusted under 35 U.S.C. 154(b) by 0 days.

(21) Appl. No.: 13/655,952

(22) Filed: Oct. 19, 2012

(65) Prior Publication Data

US 2013/0102300 A1 Apr. 25, 2013

Related U.S. Application Data

(60) Provisional application No. 61/550,090, filed on Oct. 21, 2011.

(51) Int. Cl.
*H04W 88/02* (2009.01)

(52) U.S. Cl.
USPC ............................................. 455/418

(58) Field of Classification Search
USPC ................... 455/418, 420; 348/14.08
See application file for complete search history.

(56) References Cited

U.S. PATENT DOCUMENTS

| 6,226,497 | B1 | 5/2001 | Güntzer et al. |
| 6,782,240 | B1 | 8/2004 | Tabe |
| 7,046,638 | B1 | 5/2006 | Klausner et al. |
| 7,091,825 | B2 | 8/2006 | Sahai |
| 7,596,391 | B2 | 9/2009 | Himmelstein |
| 7,725,129 | B2 | 5/2010 | Grunhold |
| 7,769,342 | B2 | 8/2010 | Tabe |
| 7,869,824 | B2 | 1/2011 | Min |
| 2007/0049197 | A1 | 3/2007 | Klein |
| 2007/0197261 | A1 | 8/2007 | Humbel |
| 2009/0163140 | A1 | 6/2009 | Packham et al. |
| 2010/0075655 | A1 | 3/2010 | Howarter et al. |
| 2011/0012720 | A1 | 1/2011 | Hirschfeld |
| 2011/0021213 | A1 | 1/2011 | Carr |
| 2011/0070930 | A1 | 3/2011 | Pothul et al. |
| 2011/0143726 | A1 | 6/2011 | de Silva |
| 2012/0264415 | A1* | 10/2012 | Baldini et al. ................ 455/420 |
| 2013/0127980 | A1* | 5/2013 | Haddick et al. ............ 348/14.08 |

* cited by examiner

*Primary Examiner* — Diane Mizrahi
(74) *Attorney, Agent, or Firm* — Harness, Dickey & Pierce, P.L.C.

(57) ABSTRACT

A system is disclosed for automatically restarting an application running on a smartphone present in a predetermined environment, after the application has been paused. A hardware interconnect apparatus may be configured to establish a first communications link with the smartphone, and also to establish a second communications link with an electronic device present at the predetermined environment. A processor executable auto launch application may be adapted to run on the smartphone to detect when a previously selected application has been at least one of stopped or paused, and to automatically re-start the previously selected application without a command being physically entered on the smartphone by a user of the smartphone.

22 Claims, 3 Drawing Sheets

SYSTEM AND METHOD FOR FORMING AUTOMATICALLY LAUNCHING USER SET DEFAULT APP FROM SMARTPHONE

CROSS-REFERENCE TO RELATED APPLICATIONS

This application claims the benefit of U.S. Provisional Application No. 61/550,090, filed on Oct. 21, 2011. The entire disclosure of the above application is incorporated herein by reference.

FIELD

The present disclosure relates to smartphones applications, and more particularly to a system and method for automatically starting a user set default application on a smartphone through the use of a hardware interconnect apparatus, and an automatic launcher program, that wirelessly interfaces the user's smartphone to another subsystem, and automatically launches a default application when the user enters the vehicle and starts it.

BACKGROUND

The statements in this section merely provide background information related to the present disclosure and may not constitute prior art.

Smartphones are exploding in popularity, as are the number of applications that are available to run on smartphones. Many such applications are helpful to use in connection with other subsystems. As one example, some applications are helpful to use in connection with a radio system of a user's motor vehicle such as a car or truck. Such applications may involve obtaining music, traffic or weather information for playback over the vehicle's radio system. This may be accomplished by using a hardware interconnect apparatus, for example the LIVIO® Connect API interconnect apparatus available from Myine, Inc. of Ferndale, Mich., which creates a wireless communications link between the user's smartphone and the vehicle radio. This is but one example, and it will be appreciated that other implementations could be provided. As another example, a pair of headphones could be the subsystem that wirelessly interfaces with the smartphone. For convenience, the above described implementation of a smartphone being used by a user within a motor vehicle will be used for the remainder of this description to provide a detailed example of how the subject matter of the present disclosure may be implemented.

While the use of a hardware interconnect device and a smartphone within a vehicle can provide a number of useful and convenient application services for the user to use while travelling in the vehicle, if the user needs to exit the vehicle for a few minutes while a particular application is running, this can cause the application to be "paused" or temporarily interrupted. When the user gets back into the vehicle and starts it, the hardware interconnect apparatus re-synchs with the user's smartphone, but the previous application that was running on the user's smartphone will be paused. In this case the user will typically be required to access his/her smartphone and manually restart the application.

As one can appreciate, the need for the user to manually restart a smartphone application that was previously running, each time the user re-enters his/her vehicle after it has been stopped, can be of significant inconvenience to the user. For example, individuals involved in sales or service activities often spend many hours during the course of a day in their vehicles, and must make frequent stops where they leave and then re-enter their vehicles a short time later. Each time they re-enter their vehicle after a stop, typically the default application on his/her smartphone will be stopped or paused (as a result of the vehicle ignition being turned off). The user then needs to access his/her smartphone manually restart the default application. This can be quite an inconvenience, especially if one needs to do it several times a day while travelling in his/her vehicle.

SUMMARY

In one aspect the present disclosure relates to a system for automatically restarting an application running on a smartphone present in a predetermined environment, after the application has been paused. The system may comprise a hardware interconnect apparatus configured to establish a first communications link with the smartphone, and a second communications link with an electronic device present at the predetermined environment. A processor executable auto launch application may be included that is adapted to run on the smartphone to detect when a previously selected application has been at least one of stopped or paused, and to automatically re-start the previously selected application without a command being physically entered on the smartphone by a user of the smartphone.

In another aspect the present disclosure relates to a system for automatically restarting an application running on a smartphone present in a vehicle, after the application has been one of paused or stopped at a first time when the user leaves the vehicle, and re-enters the vehicle at a second time subsequent to the first time. The system may comprise a hardware interconnect apparatus configured to transmit a first wireless signal to establish a first wireless communications link with the smartphone, and a second signal to establish a second wireless communications link with a radio of the vehicle. A processor executable auto launch application may be included which is adapted to run on the smartphone and to automatically launch a user preselected application. A processor executable watcher service application may also be included which is adapted to run on the smartphone and to monitor for the first wireless communications signal being transmitted from the hardware interconnect apparatus, and to assist in establishing the first wireless communications link without intervention by the user. The processor executable auto launch application may further be configured to detect when a previously selected application has been at least one of stopped or paused, and to automatically re-start the previously selected application without intervention by a user of the smartphone when the smartphone is brought into proximity with the hardware interconnect apparatus.

In still another aspect the present disclosure relates to a smartphone adapted to automatically re-start an application running on the smartphone that had been previously interrupted, and without intervention or assistance by a user of the smartphone. The smartphone may comprise a hardware interconnect apparatus configured to establish a first wireless communications link with the smartphone, and also a second wireless communications link with an electronic device present at the predetermined environment. A processor executable auto launch application may be adapted to run on the smartphone to detect when a previously selected application has been at least one of stopped or paused. The auto launch application may be adapted to automatically re-start the previously selected application without a command being physically entered on the smartphone by a user of the smartphone. A processor executable watcher service application may be included which is adapted to run on the smartphone and to monitor for a signal being transmitted from a remote hardware interconnect apparatus. The processor executable watcher service application may be adapted to assist in establishing the first wireless communications link with the remote hardware interconnect apparatus without intervention by the user. The first wireless communications link may enable the re-started, previously selected application to supply content being received by the smartphone to the remote hardware interconnect apparatus.

In still another aspect the present disclosure may relate to a method for automatically restarting an application running on a smartphone present in a predetermined environment, after the application has been paused. The method may comprise using an interconnect apparatus configured to establish a first wireless communications link with the smartphone, and to also establish a second wireless communications link with an electronic device present at the predetermined environment. An auto launch application may be used which is adapted to run on the smartphone and to detect when a previously selected application has been at least one of stopped or paused. The auto launch application may automatically re-start the previously selected application without a command being physically entered on the smartphone by a user of the smartphone. A watcher application may also be used on the smartphone to inform the smartphone when a signal is detected from the interconnect device. Subsequent to receiving the signal from the interconnect device, the first wireless communications link may be established between the interconnect apparatus and the smartphone without user intervention. The first wireless communications link may be used to supply content being received by the smartphone to the interconnect apparatus, and from the interconnect apparatus via the second wireless communications link to the electronic device.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
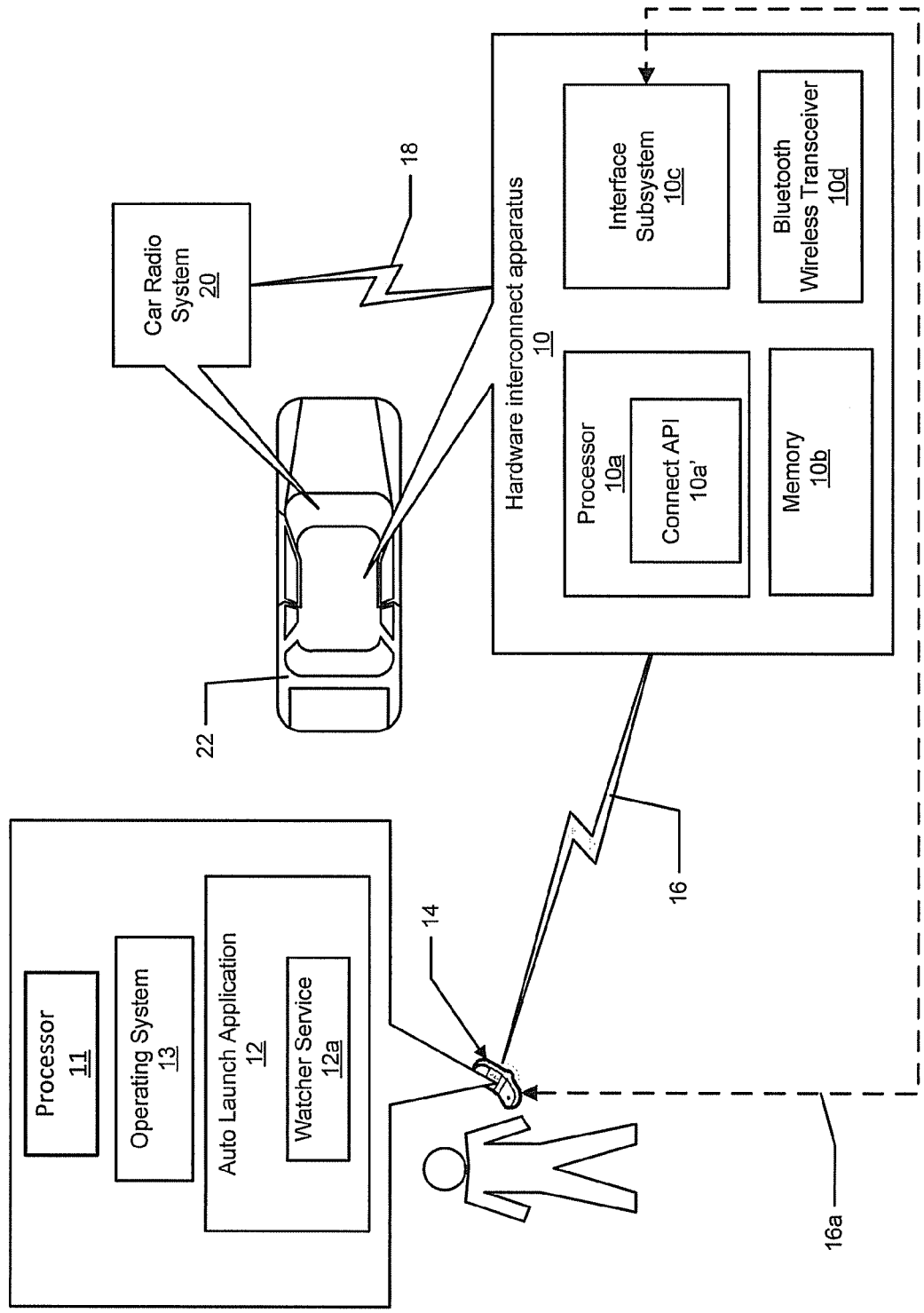
FIG. 1 is a high level block diagram of one embodiment of the present disclosure implemented in connection with a smartphone and a vehicle of a user.

The following description is merely exemplary in nature and is not intended to limit the present disclosure, application, or uses. It will be understood that throughout the drawings, corresponding reference numerals indicate like or corresponding parts and features.

Referring to FIG. 1, there is shown a high level diagram of a hardware interconnect apparatus 10 that may be used in connection with a processor executable automatic application launching API 12 ("Application Programming Interface") in accordance with one embodiment of the present application. For convenience, the automatic launching application API will be referred to throughout the following discussion simply as the "Auto Launch application 12". The API 12 may be executed by a processor 11.

The Auto Launch application 12 is loaded into and stored in non-volatile memory (not shown) of a user's electronic device, for example a smartphone 14. The smartphone 14 may be running either an iOS operating system, such as an iPhone® smartphone from Apple, Inc., (hereinafter simply "iOS"), or it may be any type of electronic device running the ANDROID® operating system (hereinafter simply the "Android operating system" or "Android OS"). Both implementations are covered by the present disclosure. For convenience the device will be referred to as the "smartphone 14" throughout the following discussion, although it will be appreciated that any other type of device capable of running the iOS operating system or the Android operating system could potentially be used. The OS of the smartphone 14 is designated by reference number 13. A processor executable "watcher service" software routine 12a (hereinafter "watcher service 12a") may also run on the processor 11 or even on a different processor (not shown). The watcher service 12a may form an extension of the Auto Launch application 12 and is thus also stored on the smartphone 14. In one embodiment the watcher service 12a watches for signals from any short range, wireless protocol enabled device. In one implementation the BLUETOOTH® wireless communications protocol is used in connection with the smartphone 14 and the hardware interconnect apparatus 10, and as such the smartphone 14 in this example forms a "Bluetooth® protocol enabled device." For convenience, the BLUETOOTH® communications protocol will be referred to throughout the following discussion simply by the name "Bluetooth", with it being understood that this name is a registered trademark, and that other suitable wireless communications protocols could be implemented in place of the Bluetooth protocol if desired.

The hardware interconnect apparatus 10 itself is preferably the LIVIO® Connect API interconnect apparatus available from Myine, Inc. of Ferndale, Mich. However, any suitable interconnect device that is able to interface the user's smartphone to a vehicle radio system may potentially be used. The LIVIO® Connect API interconnect apparatus enables a first communications link, which in this example is a suitable short range, wireless communications link, for example a Bluetooth link 16, to be established with the user's smartphone 14.

The hardware interconnect apparatus 10 may include a processor 10a, a memory 10b, an interface subsystem 10c and a Bluetooth enabled wireless transceiver 10d. The interface subsystem 10c may be used to establish a second communications link, in this example a wireless link 18, for example through analog audio, digital audio or an RF signal, such as FM, with an electronic device associated with a predetermined environment.

It will also be appreciated that instead of a wireless Bluetooth link 16, a hardwired connection 16a could be made to the hardware interconnect apparatus 10 via a suitable cable. The hardwired connection 16a may be made to a suitable port (not shown) on the interface subsystem 10c. Such a hardwired connection may be formed by using a USB cable or any other type of cable/protocol suitable for making a relatively short range connection with hardware interconnect apparatus 10. It is anticipated that in the great majority of instances, however, that users will prefer the convenience of making a wireless connection with the hardware interconnect apparatus 10. Accordingly, the following discussion will focus on such an implementation where a wireless communications link is established, but with the understanding that a hardwired connection is equally feasible.

The electronic device may be, for example, a radio system 20. The predetermined environment may be, for example, a motor vehicle 22 in which the radio system 20 is present. Of course, any implementation where it is desirable to automatically re-start an application running on the smartphone 14 is considered to be within the purview of the present disclosure. Simply as one example, the following discussion will focus on the implementation where the smartphone 14 is connecting to the car radio system 20, which in turn is being used in the motor vehicle 22. And while the motor vehicle 22 is shown as an automobile, and particularly a sedan, it will be appreciated that the hardware interconnect apparatus 10 and the Auto Launch application 12 may be implemented in virtually any type of vehicle (car, truck, van, boat, etc.) having an radio or stereo system that can produce audio from an input source through installed speakers. As will be explained in greater detail in the following paragraphs, the Auto Launch application 12 and the hardware interconnect apparatus 10 together operate to establish a wireless link 16 (i.e., "Bluetooth link") with the smartphone 14 as soon as the user enters the vehicle 22 and turns on the vehicle's ignition switch.

In general operation, when the user leaves the vehicle 22 and turns off the vehicle ignition while the user set default application is running, the default application being handled by the hardware interconnect apparatus 10 will typically stop running or be paused. When the user re-enters the vehicle 22 and then turns on the ignition switch and turns on the radio system 20, the default application would typically not start operating again without some manual intervention by the user. The intervention would typically be the user physically accessing his/her smartphone, going to the default application and commanding it to re-start. With the Auto Launch application 12, there is no need for the user to physically access his/her smartphone upon re-entering the vehicle when the user set default application had been previously running. A principal advantage of the Auto Launch application 12 is that as soon as the user re-enters the vehicle 22 and turns on the vehicle ignition switch, the hardware interconnect apparatus 10 will automatically establish the wireless communications link 16 with the user's smartphone 14. The Auto Launch application 12, which will have been preselected by the user to automatically start running whenever the user's smartphone 14 is powered on, will immediately command the user selected default application that was previously running when the vehicle 22 was last shut down, to begin running again. Thus, the user will not need to physically access his/her smartphone 14 and manually go to the default application and command it to begin running again. This is a significant benefit and convenience to the user. This is especially so if the user is prone to forgetting to re-start the default application after re-entering the vehicle. Another benefit is providing applications and content providers the business model of guaranteeing that their product will start when the vehicle is started.

It will also be appreciated that a hard-wired connection could be established with the hardware interconnect apparatus 10. Thus, the hardware interconnect apparatus 10 could be configured to recognize when a hardwired connection has been made to it with the smartphone 14. The Auto Launch application 12 could be configured to immediately launch, and thus command the user selected default application to re-start or launch.

Figure 2:
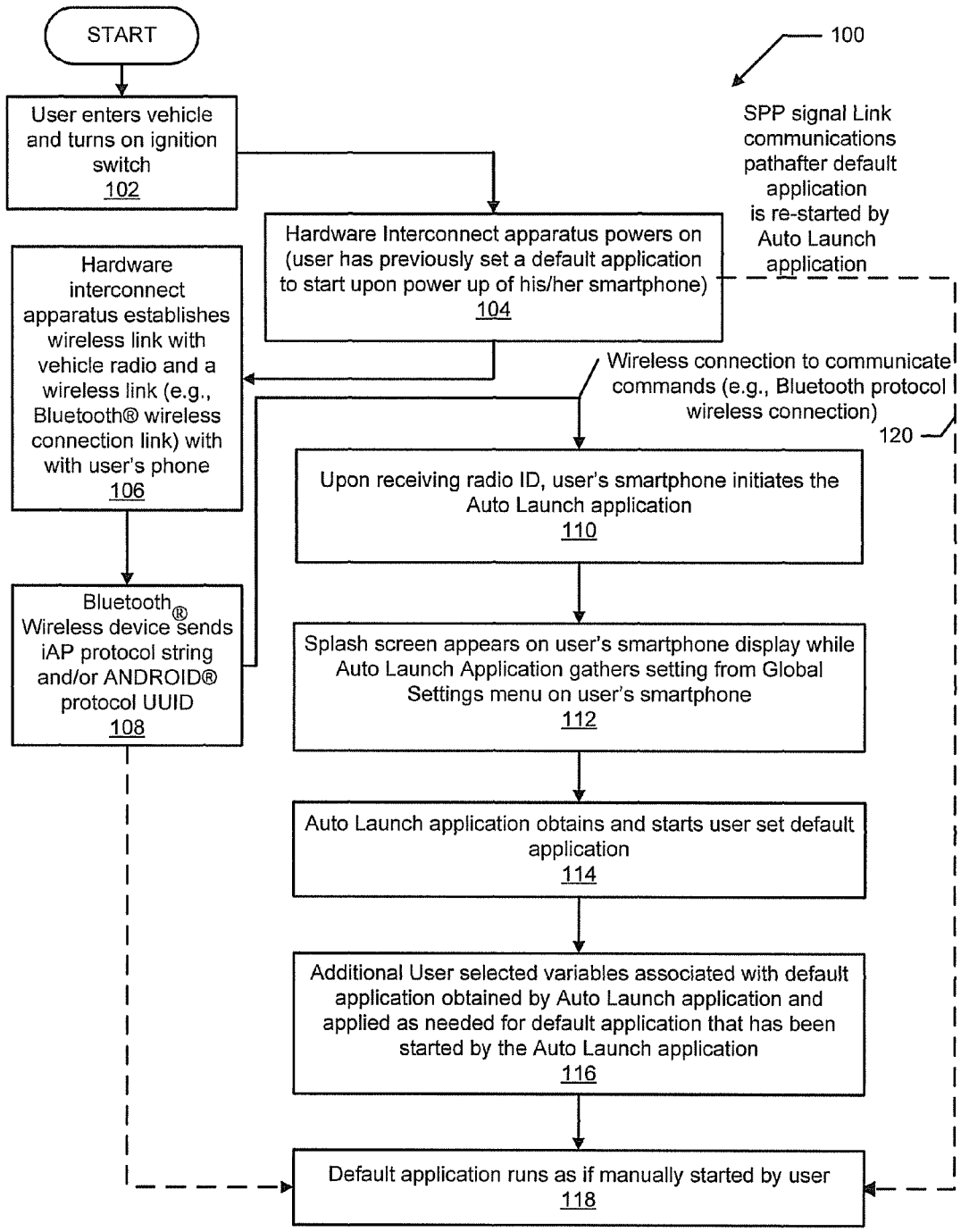
FIG. 2 is a high level flowchart of operations performed by the system of FIG. 1 when using an Apple, Inc. iPhone to automatically launch a default application from the user's smartphone when the user turns the ignition of his/her vehicle on and powers on a hardware interconnect apparatus.

Referring to FIG. 2, a more detailed flowchart 100 is shown of the various operations performed by the Auto Launch application 12 during operation. The flowchart of FIG. 2 focuses on operations performed when the user's smartphone 14 is an iPhone (running the iOS). Initially at operation 102 the user enters the vehicle 22 and turns on the vehicle's ignition switch. The hardware interconnect apparatus 10 powers up, as indicated at operation 104. It will be understood that there will be a default application on the iPhone that will start if the user has not made an explicit selection as to what application he/she wants to automatically start. If the user has made a specific selection for a different application to "autostart", then the user selected application will be the one that is automatically started when the user's smartphone comes into proximity with the car radio system 20. Also, when the smartphone is running the Android OS, the user will have preselected that the Auto Launch application 12 is to start automatically whenever the smartphone 14 is powered on. With the iOS, the user does not need to configure the Auto Launch application 12 to automatically begin running. In this instance, when an iPhone is running, the iOS will pair with the vehicle's car radio system 20 when a Bluetooth session is opened with the hardware interconnect apparatus 10. This capability will become available as soon as the user downloads and installs the Auto Launch application 12 on his/her iPhone.

The Auto Launch application 12 may also incorporate a menu screen that the user can pull up by selecting an appropriate icon on his/her smartphone 14 display. The menu screen will display all other applications that the Auto Launch application 12 may synch with and thus automatically launch. Such applications may include, without limitation, one or more of the PANDORA® streaming music application, Digitally Imported dance and music radio (DI.FM). AccuRadio, the INRIX® traveler and traffic information software, the GROOVESHARK$^{SM}$, Internet radio broadcasting service, National Public Radio (NPR), GotRadio Internet radio service and LIVE365.COM® audio program hosting, just to name a few potential applications. The different applications could involve music playback, traffic, weather, or any other type of content that the user desires to play back through the vehicle's car radio system 20, or which makes use of the display of the vehicle's radio system 20. The user may check a specific one of the applications listed in the menu and that specific application will thereafter be the application that the Auto Launch application 12 will automatically start whenever the user enters the vehicle 22. This will occur unless and until the user checks a different specific application to be the application that is automatically started by the Auto Launch application 12.

At operation 106 the hardware interconnect apparatus 10, once powered on, automatically establishes the wireless link 18 with the vehicle car radio system 20, and the wireless link 16 with the user's smartphone 22. The wireless link 16 with the user's smartphone will typically be a Bluetooth wireless link, although any other suitable type of wireless or wired link could potentially be used. For the purpose of discussion it will be assumed that wireless link 16 is a Bluetooth communications link.

At operation 108 the Bluetooth wireless device, which in this example is the hardware interconnect apparatus 10, sends a radio identification (ID) signal to the smartphone 14. In this example the radio ID signal may be "com.livio.launcher" which is used for iOS, and there may be a separate universally unique identifier (UUID) for ANDROID® OS based devices. This establishes a Bluetooth® communications protocol serial port profile (SPP) signal link with the user's smartphone 14. At operation 110, upon receiving the radio ID signal, the Auto Launch application 12 is started by the user's smartphone 14. This establishes a serial port profile (SPP) signal link between the hardware interconnect apparatus 10 and the user's smartphone 22. At operation 112 a "splash screen" notification with the Auto Launch application icon may be displayed on the user's smartphone 14 display while the Auto Launch application 12 gathers information on settings from the Global Settings menu on the user's smartphone 14.

At operation 114 the Auto Launch application 12 obtains and starts the user set default application. At operation 116 additional user selected variables associated with the default application are obtained by the Auto Launch application 12 and applied as needed for the default application that has just been started by the Auto Launch application 12. At operation 118 the default application runs just as if it had been manually commanded to run by the user. Reference number 120 indicates the communications path with the default application after it has been started by the Auto Launch application 12.

Figure 3:
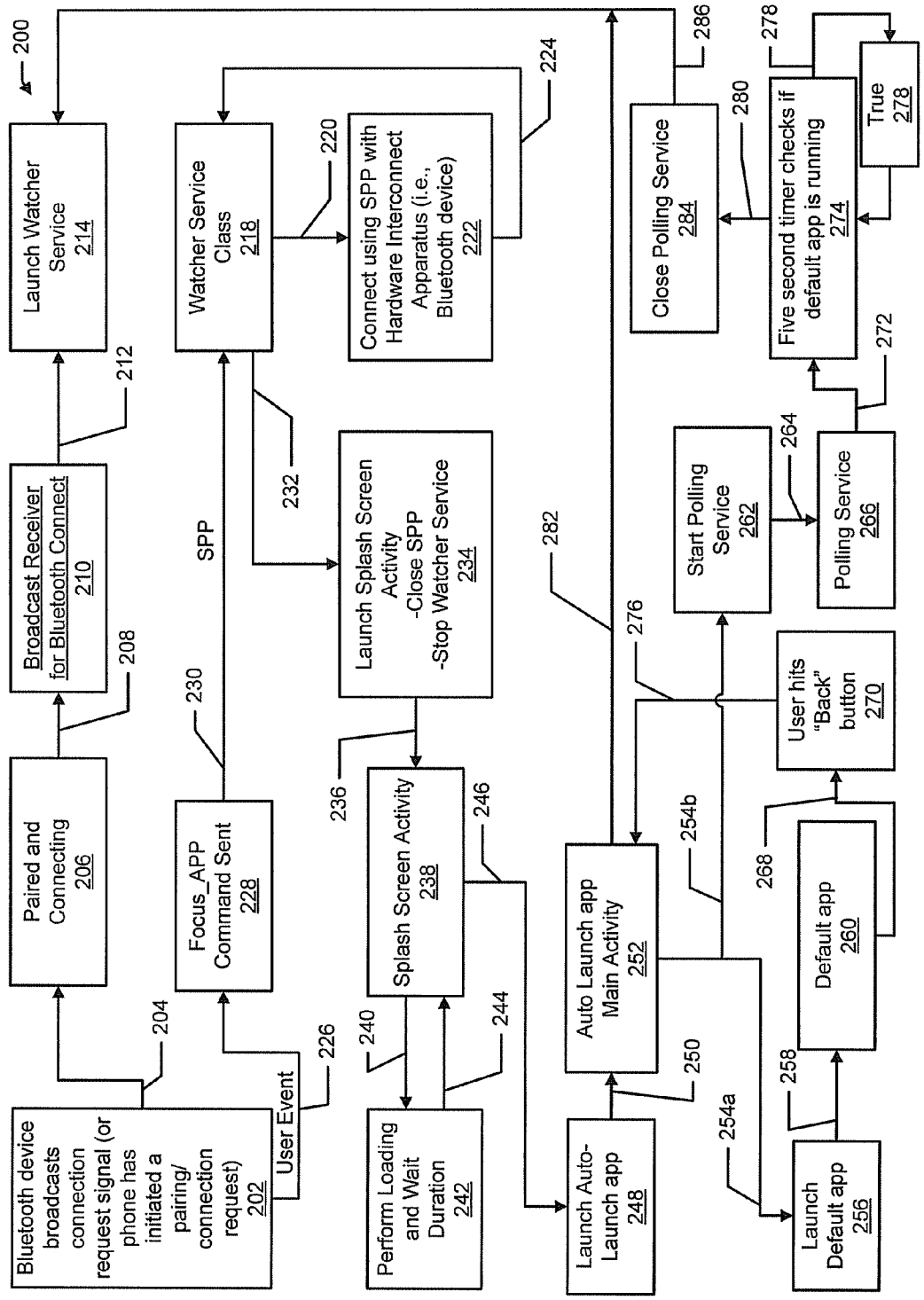
FIG. 3 is a high level flowchart of operations that occur when using a smartphone having an ANDROID® operating system.

Referring now to FIG. 3, a flow diagram 200 of operations is shown which provides one example of how the Auto Launch application 12 may be implemented with a smartphone running the Android OS. Initially at operation 202 the Bluetooth enabled device, which in this example is the hardware interconnect device 10, is broadcasting a connection request signal, or is on and the smartphone 14 has initiated a pairing/connection request, as indicated at arrow 204. Block 206 indicates the pairing and connecting process is in progress. Arrow 208 indicates the pairing and connecting process has completed. Arrow 208 also indicates that an Android ACL_CONNECT broadcast has been sent to applications that are registered. By "registered" it is meant those applications that have signed up to receive this broadcast message in the Android OS. At block 210 it is indicated that the Auto Launch application 12 has its own broadcast receiver class. The Broadcast Receiver class is registered with the Android OS to receive the broadcasted notification of an ACL_CONNECT signal with a Bluetooth device.

Arrow 212 indicates that the broadcast receiver class of the Auto Launch application 12 is taking action on the ACL_CONNECT broadcast that was sent from the Android OS. Initially, the broadcast receiver class will attempt to stop the "watcher service" 12a if the watcher service is running. At block 214 the Android OS has been handed an "Intent-To-Start" the watcher service 12a. Arrow 216 indicates that the Android OS is handling the Intent-To-Start and starts the watcher service 12a. Block 218 indicates that the watcher service 12a has been started by the Android OS.

Arrow 220 represents the watcher service 12a trying to initiate a SPP connection with paired Bluetooth devices. Block 222 represents the watcher service 12a in the process of setting up a SPP connection with the Bluetooth device (i.e., the hardware interconnect apparatus 10), as well as initializing the Connect API 10a' on the apparatus 10, upon the watcher service 12a receiving a "CONNECT" command from the hardware interconnect apparatus 10a. If the watcher service 12a was previously started with an intent that contains a parcelable Bluetooth device, it will use that information to attempt to connect with the Bluetooth device. However, if no information was available it will query the Android OS for all paired (Bonded) Bluetooth devices and attempt to connect to each one if they contain a specified label (e.g., "Livio"). The specific label is subject to change or to being extended. If one of the connections to a given Bluetooth device (in this example the apparatus 10), was successful, the attempts will stop and that device will be set as the device to perform SPP communication with. This will also start the watcher service 12a listening for the CONNECT packet from the hardware interconnect apparatus 10 to set up the Connect API. Arrow 224 indicates that the CONNECT packet was received by the smartphone 14 and that the Connect API 10a' has been initialized.

Arrow 226 and block 228 indicate that the user hit a button on the hardware interconnect apparatus 10 that is set up to send a FOCUS_APP packet through SPP as established by the Connect API 10a'. At arrow 230 the FOCUS_APP packet is sent through the SPP connection established on the Android powered smartphone 14. At arrow 232 the watcher service 12a has received the FOCUS_APP packet and will now be taking action on it. Block 234 represents the launching of the Splash Screen activity, the watcher service 12a class closing its SPP connection, and the watcher service closing itself. Arrow 236 represents the Android OS handling the intent, and block 238 represents the Splash Screen activity running. The Splash Screen activity may be used to display a logo screen before launching the user selected default application as well as to perform various start up tasks. It may contain a timed wait to display the logo screen before continuing the chain to launch the selected default application by sending an "Intent-To-Start" the Auto Launch application 12. Arrow 240 represents the Splash Screen activity running and a selected logo being displayed on the display of the user's smartphone. Block 242 represents the Splash Screen activity performing loading functions, if needed, and waiting a certain time duration to appear in the foreground before sending the "Intent-To-Start" message to the Android OS for the Android OS to start the Auto Launch application 12, as well as closing the Splash Screen activity. Arrow 244 represents that the data loading is finished and the wait time is over.

Arrow 246 represents that the Splash Screen activity sends the Android OS an "Intent-To-Start" message with "Intent-A-String-Extra" that states to launch the Auto Launch application 12. Block 248 represents the Intent being sent and handled to start the Auto Launch application 12.

Arrow 250 represents that the Android OS is handling the Intent and starts the Auto Launch application 12. Block 252 represents the Auto Launch application 12 operating. When it starts up it will query the Android OS for all installed application packages. These may all be displayed in a custom view layout that may include, for example, the application icon, the name of the application and a radio button. If a user selects one of the applications by a finger/click press, the row background may turn to a different color or shade, and the radio button may also change to the set position image. This may also cause the previously set (i.e., old) default application to go back to the standard state of a certain gradient, for example a white gradient image, and with the "not set" radio button image displayed next to the icon. This is also the main GUI (graphic user interface). The user can also select which application to set as the default application which will be started automatically by the Auto Launch application 12. At this GUI the user may also choose different application specific settings. Block 252 is also responsible for storing the default application information and launching the default application on receiving the corresponding Intent.

Arrows 254a and 254b represent the Auto Launch application 12 having read in the Intent String Extra and doing two things. At block 256 the Intent has been sent and is being handled to start the selected default application set by the user. The user selected default application information is saved to a shared preference instance in the Android OS. Arrow 258 represents the Android OS handling the Intent and starting the default application that was specified from the Auto Launch application 12. Block 260 represents the default application that was launched from the Auto Launch application 12. User selected default application information is saved to a shared preference instance in the Android OS. Block 262 represents sending and handling of the "Intent-To-Start" the Polling Service. Arrow 264 represents the Android OS handling the "Intent-To-Start" and starting the Polling Service, and block 266 represents the Polling Service running. The Polling Service's main task is to run a query on an Activity Manager running on the smartphone 14 to find out if the default application that was launched from the Auto Launch application 12 is still running. This timer may happen every few seconds, for example every five seconds. It will close itself on finding the application 12 not running anymore and then start the Watcher Service 12a.

Arrow 268 and block 270 represent the user hitting the "Back" button on his/her smartphone 14 while the launched default application was in the foreground. This would, of course, close the default application and return control to the Auto Launch application 12. The Android OS will then determine the next course of action.

At arrow 272 the Polling Service starts a timer represented by block 274. This timer may be run every few seconds, such as every five seconds. At arrow 276 the Android OS recognizes the Auto Launch application 12 was the last process on the stack previous to the default application. The Android OS then returns the Auto Launch application 12 to the foreground. This makes a call to an "onResume" subroutine within the activity. As described in the Android document on Activity Lifecycles, the onResume subroutine will be called when the user returns to the application. This function is part of an "Activity" class of the Auto Launch application 12 and it has been overridden to perform specific actions, as indicated by line 282.

Arrow 278 represents the timer having found the default application to be running. It stops its query and waits to be started again. Arrow 280 represents the timer as not having found the default application to be running anymore. The Polling Service sends the Android OS an "Intent To Start" the Watcher Service 12a.

The arrow 282 represents the onResume subroutine contained code to send an Intent to the Android OS to start the Watcher Service 12a.

Arrow Block 284 represents the closing of the Polling Service upon no longer finding the default application to be running. Line 286 represents the Polling Service has closed itself and the flow restarts at block 214.

From the foregoing it will be appreciated that the Auto Launch application 12 significantly enhances the convenience to users in using the various applications on their smartphones. This is especially so when the user is operating a motor vehicle, and even more so for users that are in their vehicles for a good part of each day, and who repeatedly have to stop, leave their vehicle for a short while, and then get back into the vehicle and drive to a different location before again leaving the vehicle for a short while. The Auto Launch application 12 also eliminates the possibility that the user may realize, only after re-entering his/her vehicle and driving onto a crowded street, freeway or highway, that he/she needs to manually restart an application, and then must pull off the road and manually enter the proper command to his/her phone to restart the default application on his/her smartphone.

Moreover, it is an advantage that the Auto Launch application 12 can be configured to work with a variety of applications that are available for use on smartphones, regardless of the operating system that the smartphone employs. In this regard the Auto Launch application 12 is able to detect the specific application that the user has set as the default application, and includes the necessary command to start, or re-start, the application as soon as the user enters the vehicle 18.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for automatically restarting an application running on a smartphone, the system comprising:
a hardware interconnect apparatus configured to establish a first communications link with the smartphone, and a second communications link with an electronic device present within a vehicle; and
a processor executable auto launch application adapted to run on the smartphone, to obtain and start a previously selected default application, and to detect when the previously selected default application has been at least one of stopped or paused as a result of the smartphone is removed from the vehicle, and to automatically command a re-start of the previously selected default application running on the smartphone without requiring a separate command to be physically entered on the smartphone by a user of the smartphone when the smartphone is again physically moved into the vehicle by the user and an ignition switch of the vehicle is turned on by the user.

2. The system of claim 1, wherein the first communications link comprises a wireless communications link.

3. The system of claim 1, wherein the first communications link comprises a hardwired connection between the smartphone and the hardware interconnect apparatus.

4. The system of claim 1, wherein the electronic device comprises a device that produces an audio signal.

5. The system of claim 1, wherein the electronic device comprises a radio.

6. The system of claim 1, further comprising a processor executable watcher service application configured to run on the smartphone, and further configured to assist in establishing the first communications link with the hardware interconnect apparatus.

7. The system of claim 6, wherein the watcher service application automatically attempts to establish the first communications link when the smartphone is brought in proximity to the electronic device of the vehicle by the user of the smartphone.

8. The system of claim 1, wherein the second communications link established between the hardware interconnect apparatus and the electronic device comprises a second wireless communications link.

9. The system of claim 1, wherein the processor executable auto launch application is further configured to obtain at least one variable associated with the user selected default application.

10. The system of claim 1, wherein the hardware interconnect apparatus is configured to broadcast a connection request signal when the hardware interconnect apparatus is initially powered on.

11. The system of claim 10, wherein the connection request signal comprises a radio identification signal.

12. The system of claim 10, wherein the first communications link comprises a short range wireless signal formed by a serial port profile (SPP) signal link which is established subsequent to transmission of the connection request signal to the smartphone.

13. The system of claim 9, wherein a splash screen notification is generated on a display of the smartphone while the auto launch application obtains the at least one variable.

14. A system for automatically restarting an application running on a smartphone present in a vehicle, after the application has been one of paused or stopped at a first time when a user leaves the vehicle, and then re-enters the vehicle at a second time subsequent to the first time, the system comprising:
- a hardware interconnect apparatus configured to transmit a first wireless signal to establish a first wireless communications link with the smartphone, and a second wireless signal to establish a second wireless communications link with an electronic device of the vehicle;
- a processor executable auto launch application adapted to run on the smartphone and to automatically obtain and launch a previously user preselected default application when the smartphone is powered on, as well as additional user selected variables associated with the previously user preselected default application;
- a processor executable watcher service application adapted to run on the smartphone and to monitor for the first wireless signal being transmitted from the hardware interconnect apparatus, and to assist in establishing the first wireless communications link without intervention by the user; and
- the processor executable auto launch application further being configured to detect when a previously selected default application has been at least one of stopped or paused as a result of the smartphone being physically removed from the vehicle, and to automatically re-start the previously selected default application without intervention by a user of the smartphone when the smartphone is brought back into the vehicle in proximity with the hardware interconnect apparatus by the user, and an ignition switch of the vehicle is turned on by the user.

15. The system of claim 14, wherein the processor executable auto launch application is further configured to obtain at least one variable associated with the user selected default application.

16. The system of claim 14, wherein the hardware interconnect apparatus is configured to broadcast a connection request signal when the hardware interconnect apparatus is initially powered on.

17. The system of claim 16, wherein the first wireless signal comprises a serial port profile (SPP) signal link which is established subsequent to transmission of the connection request signal to the smartphone.

18. The system of claim 15, wherein a splash screen notification is generated on a display of the smartphone while the auto launch application obtains the at least one variable.

19. A smartphone adapted to automatically re-start an application running on the smartphone that had been previously interrupted, because of removal of the smartphone from within a vehicle, without intervention or assistance by a user of the smartphone once the smartphone is again brought back into the vehicle, the smartphone comprising:
- a hardware interconnect apparatus configured to establish a short range wireless communications link with the smartphone, and a second communications link with an electronic device present within the vehicle;
- a processor executable auto launch application adapted to run on the smartphone, to obtain and launch a previously selected default application set by the user, and to detect when the previously selected default application has been at least one of stopped or paused as a result of the smartphone having been removed from the vehicle, and to automatically re-start the previously selected default application without a command being physically entered on the smartphone by a user of the smartphone, when the smartphone is again brought back into the vehicle and an ignition switch of the vehicle is turned on;
- a processor executable watcher service application adapted to run on the smartphone and to monitor for a wireless signal being transmitted from a remote hardware interconnect apparatus, and to assist in establishing the first communications link with the remote hardware interconnect apparatus without intervention by the user; and
- the first communications link enabling the re-started, previously selected default application to supply content being received by the smartphone to the remote hardware interconnect apparatus.

20. The smartphone of claim 19, wherein the processor executable auto launch application is further configured to obtain at least one variable associated with the previously selected default application.

21. The smartphone of claim 19, wherein the processor executable watcher service application is configured to watch for a broadcast connection signal from the hardware interconnect apparatus.

22. A method for automatically restarting an application running on a smartphone present in a vehicle, after the application has been paused, the method comprising:
- using an interconnect apparatus, configured to establish a first wireless communications link with the smartphone, to also establish a second wireless communications link with an electronic device present in the vehicle;
- using an auto launch application adapted to run on the smartphone, to obtain and launch a previously user selected default application, and to detect when the previously user selected default application has been at least one of stopped or paused, as a result of the smartphone having been being removed from the vehicle;
- using the auto launch application to automatically re-start the previously user selected default application without a command being physically entered on the smartphone by a user of the smartphone, when the smartphone is again brought back into the vehicle and an ignition switch of the vehicle is turned on;
- using a watcher application on the smartphone to inform the smartphone when a wireless signal is detected from the interconnect apparatus;
- subsequent to receiving the wireless signal from the interconnect apparatus, establishing the first wireless communications link between the interconnect apparatus and the smartphone without user intervention; and
- using the first wireless communications link to supply content being received by the smartphone to the interconnect apparatus, and using the second wireless communications link to communicate between the interconnect apparatus and the electronic device.

* * * * *